United States Patent [19]

Carlson

[11] Patent Number: 4,607,254

[45] Date of Patent: Aug. 19, 1986

[54] FLOW DETECTOR

[75] Inventor: Adolph C. Carlson, Hagerstown, Md.

[73] Assignee: Kennecott Corporation, Cleveland, Ohio

[21] Appl. No.: 262,762

[22] Filed: May 11, 1981

[51] Int. Cl.⁴ .............................................. G08B 21/00
[52] U.S. Cl. ................................. 340/606; 73/861.04; 73/861.18; 310/329
[58] Field of Search ............... 340/606, 607, 608, 609, 340/610, 603; 73/861.04, 861.18, 861.21, 861.08, 861.22; 310/321, 323, 329

[56] References Cited

U.S. PATENT DOCUMENTS

| | | | |
|---|---|---|---|
| 3,176,513 | 4/1965 | Kriete | 73/861.18 |
| 3,580,092 | 5/1971 | Scarpa | 73/861.18 |
| 3,821,726 | 6/1974 | Chang et al. | 73/861.18 X |
| 4,110,654 | 8/1978 | Paul | 310/323 |
| 4,307,602 | 12/1981 | Sawada et al. | 310/321 |

Primary Examiner—James L. Rowland
Assistant Examiner—Daniel Myer
Attorney, Agent, or Firm—B. J. Kearns; R. Lawrence Sahr; H. M. Snyder

[57] ABSTRACT

A flow sensor to detect changes in the mass flow per unit time of pneumatically conveyed particles within a system. The flow sensor or detector includes a conduit segment formed of a hard material so that a wall of the segment will vibrate due to the impacting of the particles thereagainst as they flow through the conduit segment. There is associated with the segment a vibration excitable piezoelectric transducer which has a resonant frequency and which at the resonant frequency generates an electrical signal or high voltage as compared to that generated by the transducer at all other frequencies, above and below the resonant frequency. Any deviation in the high generated voltage is utilized to detect a change in the kinetic energy of the particles flowing through the conduit segment.

7 Claims, 5 Drawing Figures

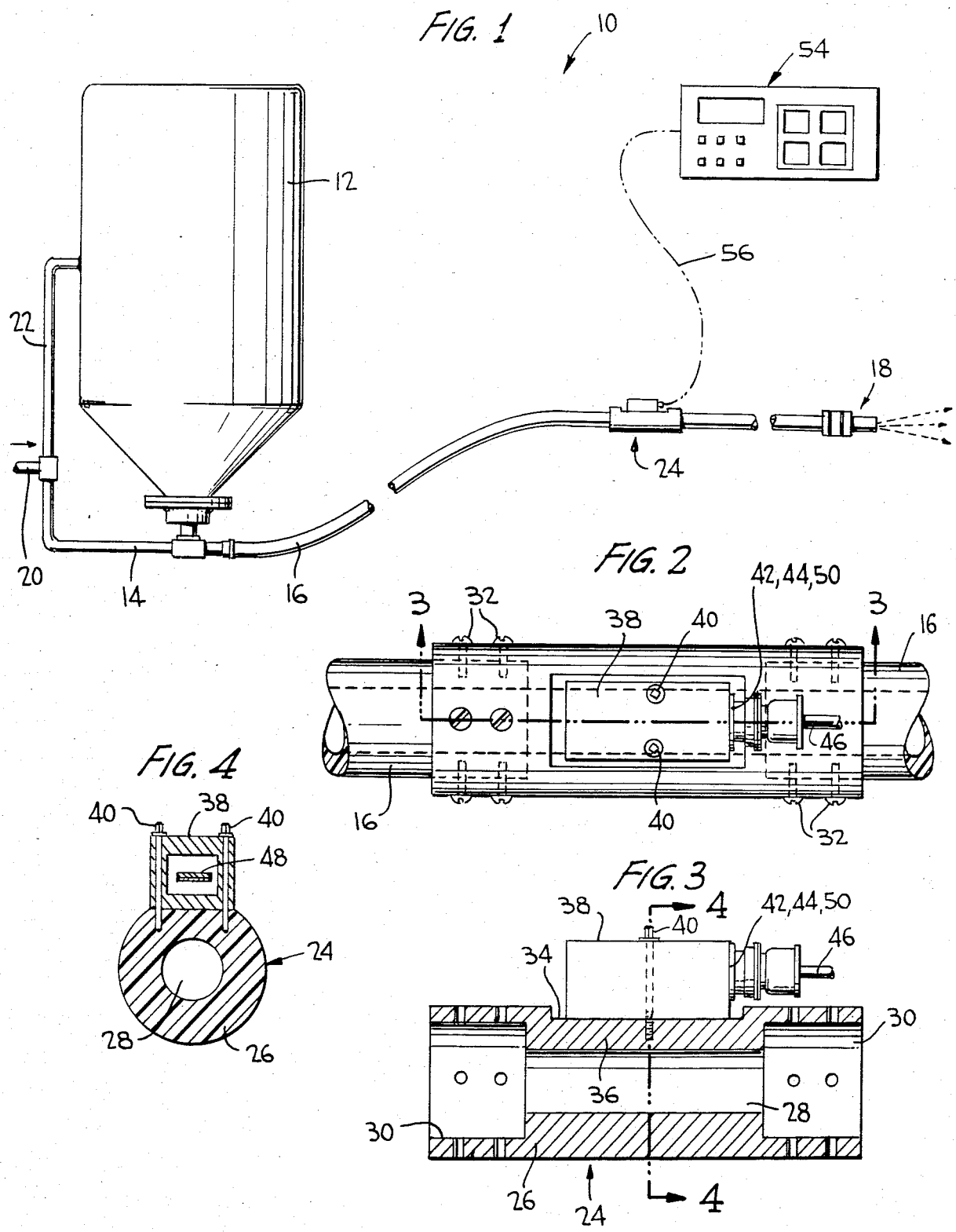

FLOW DETECTOR

This invention relates in general to new and useful improvements in devices for the detecting of the mass flow rate of particles being pneumatically conveyed, and more particularly to a flow detector or sensor of the transducer type for sensing or detecting changes in mass flow rate of such particles.

In accordance with this invention, it has been found that if the conduit through which the particles are normally pneumatically conveyed is provided with a conduit segment having an active wall formed of hard material which can vibrate in accordance with particles impinging thereagainst, and if the segment wall has coupled thereto the mechanical pickup of a transducer which generates a strong electrical signal at a frequency that differs materially from the frequencies of vibrations to which it may be subjected other than those imparted to the segment wall by the mass flow rate per unit of time of the particles (kinetic energy), and wherein the transducer may be coupled to a monitoring system wherein any change in the mass flow rate (kinetic energy) of the particles may be readily detected.

Most particularly, there has been increased emphasis of the need within the blast cleaning and shot peening industry to accurately monitor the mass flow rate of the blast media to an air blast nozzle. A typical air blast system comprises a pressurized air tank containing an abrasive media which is metered into a compressed air line which pneumatically conveys the abrasive media to an air blast nozzle. The air and abrasive media mixture is accelerated and propelled from the nozzle to perform the useful work of blast cleaning, shot peening and other types of work.

There are several possible flow conditions which affect the normal operation of a typical air blast system. These include:

1. A partially or wholly plugged nozzle which imparts on the system a lower or completely stopped flow condition.
2. The improper metering of the abrasive media into the compressed air line inducing a flow condition detrimental to proper blast efficiency.
3. Unexpected variations in volume and pressure of the compressed air supply.

For example, in the shot peening industry, process control (shot quantity and velocity) is of paramount importance for its proper application.

In accordance with this invention, there is provided a system which detects and monitors the dynamic characteristics of particulate matter as it is being conveyed pneumatically. The flow of entrained particles is not ideal, i.e., 100% efficiency is not obtainable. The flowing particles will have a velocity similar to the conveying medium. However, the direction in which the particles flow will have numerous random variations due to the incidental impingements occurring against the conduit wall through which they are flowing. The energy of these impingements is a function of the individual energy of each particle, and the number of particles in the flow. As the number of particles moving in the flow increases per unit of time, their combined mass increases. Therefore, as the mass of flow varies with number of particles in the flow stream, the total kinetic energy in the mass of flowing particles also varies. A portion of the kinetic energy in the mass flow is transferred to the wall of the conduit that surrounds the mass flow in the form of vibration. The vibrations are transduced into a voltage signal by a vibration excited transducer in contact with an isolated, hard material exterior surface of the conduit segment. The transducer generates an output voltage having an amplitude at its resonant frequency of at least one order of magnitude, in terms of decibels, greater than its voltage output at all frequencies other than at resonance for a given excitation force. The generated electrical signal varies with the kinetic energy of the mass of particles flowing through the conduit and is, thus, indicative of the overall flow condition. When properly interfaced with other equipment, the signal is utilized as a means for sensing and detecting abnormal flow conditions (changed mass or velocity) and may be utilized as an accurate process control.

Most particularly, in accordance with this invention, it is proposed to provide a vibration excited transducer which generates a voltage at its resonant frequency which is materially greater than the voltage generated at all other frequencies. Thus, the generated voltage of the output of the transducer remains at a constant level at all times during which the mass flow rate is the selected one. Therefore, when the mass flow (kinetic energy of the particles flowing in the conduit segment, which may change as to particle mass, particle velocity, or both) varies, the output voltage of the transducer will vary in accordance with such change or variation and may be monitored to produce a signal indicative of this change or variation in kinetic energy. The detected change may then be utilized to trigger alarm devices or to control the operation of the equipment.

With the above, and other objects in view that will hereinafter appear, the nature of the invention will be more clearly understood by reference to the following detailed description, the appended claims and the several views illustrated in the accompanying drawings.

FIG. 1 is a schematic elevational view of a typical air blast system in accordance with this invention wherein there is incorporated in the conduit for the flowing particles a conduit segment equipped with a transducer in accordance with this invention, the transducer being illustrated as being connected to a control unit.

FIG. 2 is an enlarged plan view of that portion of the conduit incorporating therein the conduit segment and transducer.

FIG. 3 is a fragmentary longitudinal sectional view taken generally along the line 3—3 of FIG. 2 and shows specifically the construction of the conduit segment and the manner in which a block carrying the transducer and an associated preamplifier is coupled to the wall of the conduit segment.

FIG. 4 is a fragmentary transverse vertical sectional view taken generally along the line 4—4 of FIG. 3 and shows more specifically the details of the mounting block with respect to the conduit segment and the beam of the transducer.

Figure 5:
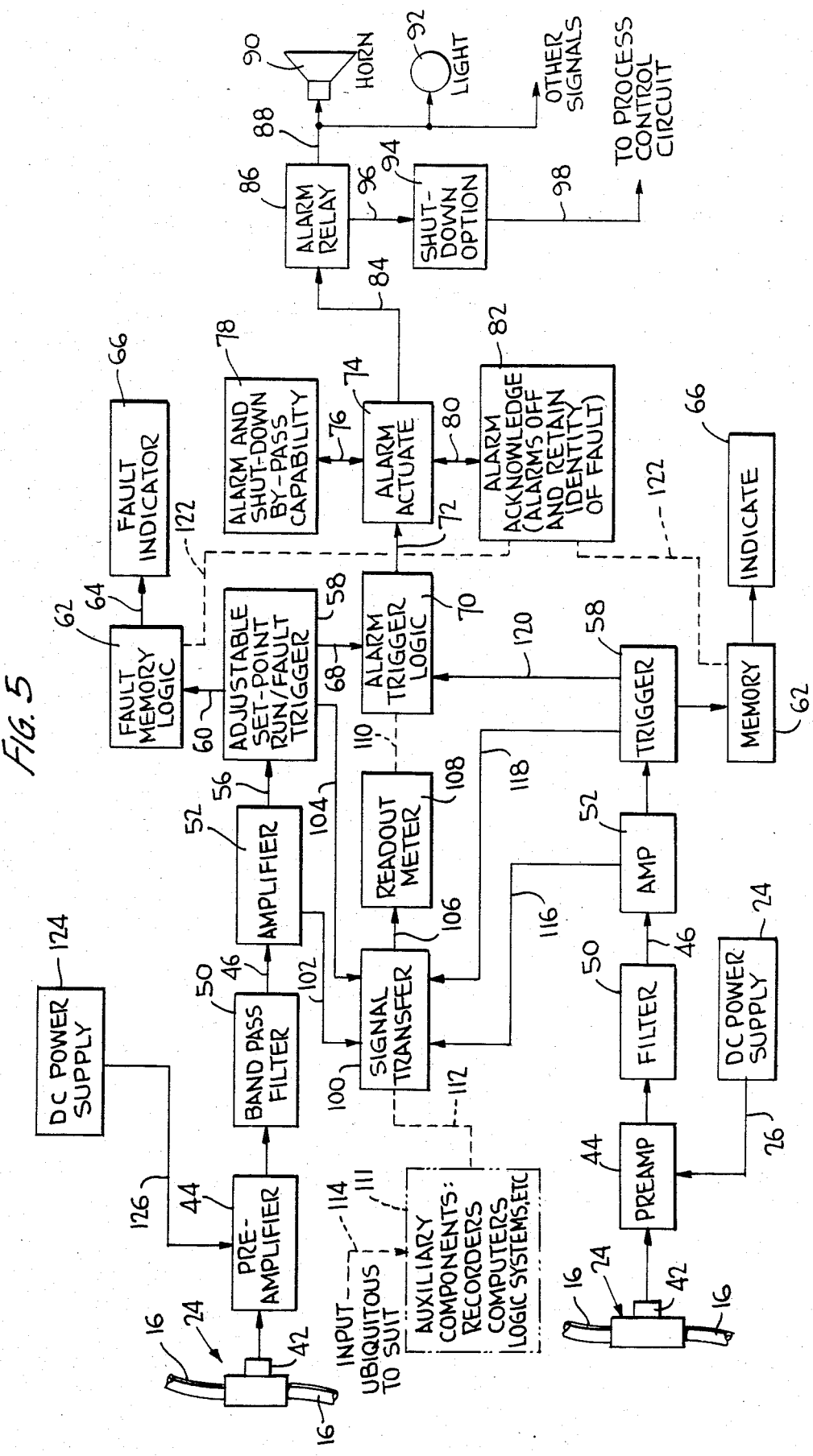
FIG. 5 is a schematic of a control system which may incorporate a plurality of the flow sensors or detectors.

Referring now to the drawings in detail, it will be seen that there is illustrated in FIG. 1 a typical air blast system which is generally identified by the numeral 10 and includes a pressurized air tank 12 which contains an abrasive media which is to be metered into a compressed air line 14 which is coupled to a conduit 16 which pneumatically conveys the abrasive media to an air blast nozzle 18. The compressed air line 14 also includes an extension 22 which is coupled to the air blast tank 12. Further, there is a main air supply line 20.

In accordance with this invention, there is mounted within the conduit 16 a conduit segment which is generally identified by the numeral 24. The conduit segment is formed of a hard material, such as aluminum, steel, plastic and other hard materials. The conduit segment 24 is formed from a length of tubing 26 having a bore 28 therethrough of a diameter corresponding to the normal bore diameter of the conduit 16. The opposite ends of the tube 26 are provided with counter bores 30 of a size to snuggly receive the conduit 16. Suitable fasteners 32 are utilized to clamp the ends of the conduit sections 16 within the bores 30, as is best shown in FIG. 2.

The intermediate portion of the tube 26 is machined so as to define a flat surface 34 which, in turn, defines a wall 36 of the conduit segment 24. While the wall 36 has been illustrated as being rather thick, it is to be understood that the wall 36 is to be as thin as is feasible under the operating conditions of the system. It is to be understood that the wall 36 will vibrate due to the conveyed particles bouncing off of the wall and that the vibration amplitude of the wall 36 will be in accordance with that induced by the mass flow of particles. Most specifically, the vibrational amplitude of the wall 36 will be directly proportional to the mass flow rate per unit time of the particles being pneumatically conveyed through the conduit segment 24.

A hollow block 38 of a hard material is suitably bolted by means of fasteners 40 to the flat surface 34 of the wall 36. The hollow block 38 carries a vibrational excitable piezo-electric transducer 42 and a solid state preamplifier 44. The preamplifier 44 has coupled thereto an electrical conduit 46 which, as described in more detail hereinafter, serves to both transmit the output signal of the transducer 42 and to supply to the preamplifier 44 a DC voltage power source.

The piezo-electric transducer 42 is preferably of the cantilevered beam type accelerometer and includes a beam 48 (FIG. 4) which is connected to the piezo element.

The cantilevered beam type transducer was selected because:

1. The length of the beam can be easily adjusted to resonate at a selected frequency.
2. The mass of the beam and its mechanical mounting can be selected and designed to cause the piezo-electric element to generate little or no voltage except at resonance.
3. The beam can be shaped and mounted to vibrate in a primary plane which is at a right angle to the direction of flowing particles within the bore 28 with the length of the beam being parallel to the axis of the bore 28. This arrangement reduces excitation of the beam by forces other than those induced by particles flowing inside the conduit segment 24.

At this time it is pointed out that the transducer and the preamplifier are electrically insulated from the block 38 and are further isolated by a shielding membrane (not shown) that prevents inducement of spurious electrical noise into the output signal from the sensor.

At this time it is pointed out that initially there was an arbitrary choice of a resonant frequency of 3.1 KHz. It has been found that this frequency is quite functional, but may be changed depending upon the specific details of the wall 36 and the particle mass flow rate per unit of time.

Referring now to FIG. 5, it will be seen that there is a preamplifier circuit which includes the preamplifier 44, a band pass filter 50 and an amplifier 44. The amplifier 52 raises the voltage generated by the transducer at its resonant frequency, severely attenuates voltage at frequencies above and below resonance, and converts the high impedance of the transducer generated signal to a low impedance output signal.

Due to the low impedance (2KΩ or under) of the output signal from the device, it can be connected to auxiliary electrical devices by lengthy conductors without significant loss of signal voltage or inducement of spurious effects on the signal provided only that the conductors are of the shielded type.

The device is coupled to a fault finding annunciator component 54 by such a shielding conduit 46, as is best shown in FIG. 1. Referring to FIG. 5, it will be seen that the annunciator component 54 may include an adjustable set-point run/fault trigger device 58 to which the signal from the transducer is directly transmitted.

A lead 60 from the trigger 58 may be directed to a fault memory logic device 62 which, in turn, is coupled by a lead 64 to a fault indicator 66 of any desired type.

Another lead 68 from the trigger 58 may be directed to an alarm trigger logic device 70 which, in turn, is coupled by a lead 72 to an alarm actuator 74. The alarm actuator 74 may, in turn, be coupled to several types of alarm devices. For example, a lead 76 may couple the alarm actuator to an alarm and shut-down bi-pass capability device 78.

The alarm actuator may also be coupled by a lead 80 to an alarm acknowledging device 82 which turns alarms off and retains identity of the fault.

As an alternative, the alarm actuator 74 may be coupled by means of a lead 84 to an alarm relay 86 which, in turn, may be connected by a lead 88 to various types of alarm devices including a horn 90 and a light 92 or to other signal devices. A shut-down option device 94 may be coupled to the alarm relay by a lead 96 and the device 94 may be coupled by a lead 98 to a process control circuit for shutting down the equipment.

At this time, it is pointed out that the alarm trigger logic device 70 is also controlled by a further circuit which includes a signal transfer device 100 which is coupled to the amplifier 52 by a lead 102 and to the trigger device 58 by a lead 104. The signal transfer device 100 is coupled by a lead 106 to a read out meter 108 which will identify the mass flow rate. The meter 108 may, in turn, be connected by a lead 110 to the alarm trigger logic device 70.

It is also to be understood that the control system may include auxiliary components, recorders, computers, logic systems, etc. which are generally identified by the numeral 111 and may be coupled to the signal transfer device 100 by a lead 112. Such auxiliary components may be provided with a further input 114 to suit.

It is also to be understood that the control system may be coupled to one or more additional sensors each of which would be provided with its own preamplifier 44, filter 50, amplifier 52, trigger device 58, fault memory logic device 62 and fault indicator 66. Amplifier 52 is coupled by lead 116 to signal transfer device 100 as would the trigger 58 by means of a lead 118. The trigger device 58 would also be connected to the alarm trigger logic device 70 by a lead 120.

At this time it is also pointed out that the alarm acknowledging device 82 would be coupled to the fault memory logic device 62 by lead 122.

It is to be understood that the annunciator system of FIG. 5 is only one of the many systems which may be utilized in conjunction with the flow sensors or detectors.

It is also pointed out here that a DC power supply 124 is connected to each of the preamplifiers 44 by means of a conductor 126 which is coupled with the lead 46 such that the lead 46 serves to both provide the DC power to the preamplifier 44 and to transmit the signal from the transducer.

The flow sensor or detector has been tested with a number of different particle components and have produced equally viable signals with respect to the following particulates:

(a) round metal balls ranging from 0.011" to 0.066" in diameter;
(b) metallic grit in numerous sizes;
(c) plastic particles known as "POLYBLAST" walnut shell fragments of various sizes sawdust;
(d) wheat flour; and
(e) aluminum oxide and silicon carbide particles.

Although only a preferred embodiment of the flow sensor or detector and its operating system has been specifically illustrated and described herein, it is to be understood that minor variations may be made in the flow sensor without departing from the spirit and scope of the invention as defined by the appended claims.

I claim:

1. A flow detector for detecting and monitoring the dynamic characteristics of particulate matter as it is conveyed pneumatically within a conduit, said flow detector comprising a conduit segment formed of a hard material and having a wall subject to vibration in response to particles striking said wall as the particles flow through the conduit segment, said conduit segment having an internal cross section corresponding to that of a conduit of which said conduit segment is a part, a vibrational excitable piezoelectric transducer which generates an output voltage having an amplitude at a preselected transducer resonant frequency on the order of 3.1 KHz being of at least one order of magnitude greater than its voltage output at all other frequencies, the resonant frequency of said transducer excited by the vibration amplitude of said wall regardless of the vibratory frequency of said wall or the impact of particles thereon for a selected desired particle mass flow rate per unit of time, and means mounting said transducer in operative engagement with said wall, said transducer being of a cantilevered beam type with said beam effective length being adjusted to resonate at said preselected frequency, with the mass of said beam and the mechanical mounting of said beam being selected to cause said piezoelectric transducer to generate little or no voltage at frequencies other than said preselected resonant frequency, and said beam being shaped to vibrate in a plane at a right angle to a longitudinal axis of said flow segment and the length of said beam being parallel to said axis to reduce excitation of said beam by forces acting on said conduit segment wall other than those induced by particles flowing through said conduit segment.

2. A flow detector according to claim 1 wherein said means mounting said transducer in operative engagement with said wall comprises a block of hard material fixedly secured to said wall, said transducer being mounted in said block.

3. A flow detector according to claim 2 together with a preamplifier circuit coupled to said transducer and including an amplifier for raising the voltage generated by said transducer at its resonant frequency while severely attenuating the voltage at frequencies other than said resonant frequency and converting a high impedance of a transducer generated signal to a low impedance output signal.

4. A flow detector according to claim 3 wherein the impedance of said low impedance output signal is on the order of 2KΩ or less.

5. A flow detector according to claim 3 together with means for connecting said output signal to a control device.

6. A flow detector according to claim 1 wherein said means mounting said transducer in operative engagement with said wall comprises a block of hard material fixedly secured to said wall, said transducer being mounted in said block, and a solid state preamplifier also mounted in said block and electrically coupled to said transducer.

7. A flow detector according to claim 1 wherein there is a solid state preamplifier connected to said transducer, a conductor coupled to said preamplifier for transmitting an output signal from said transducer, and a DC power supply coupled to said preamplifier through said conductor.

* * * * *